INVENTORS
JOHN M. TYLER
THOMAS G. SOFRIN
BY Vernon F. Hauschild
ATTORNEY

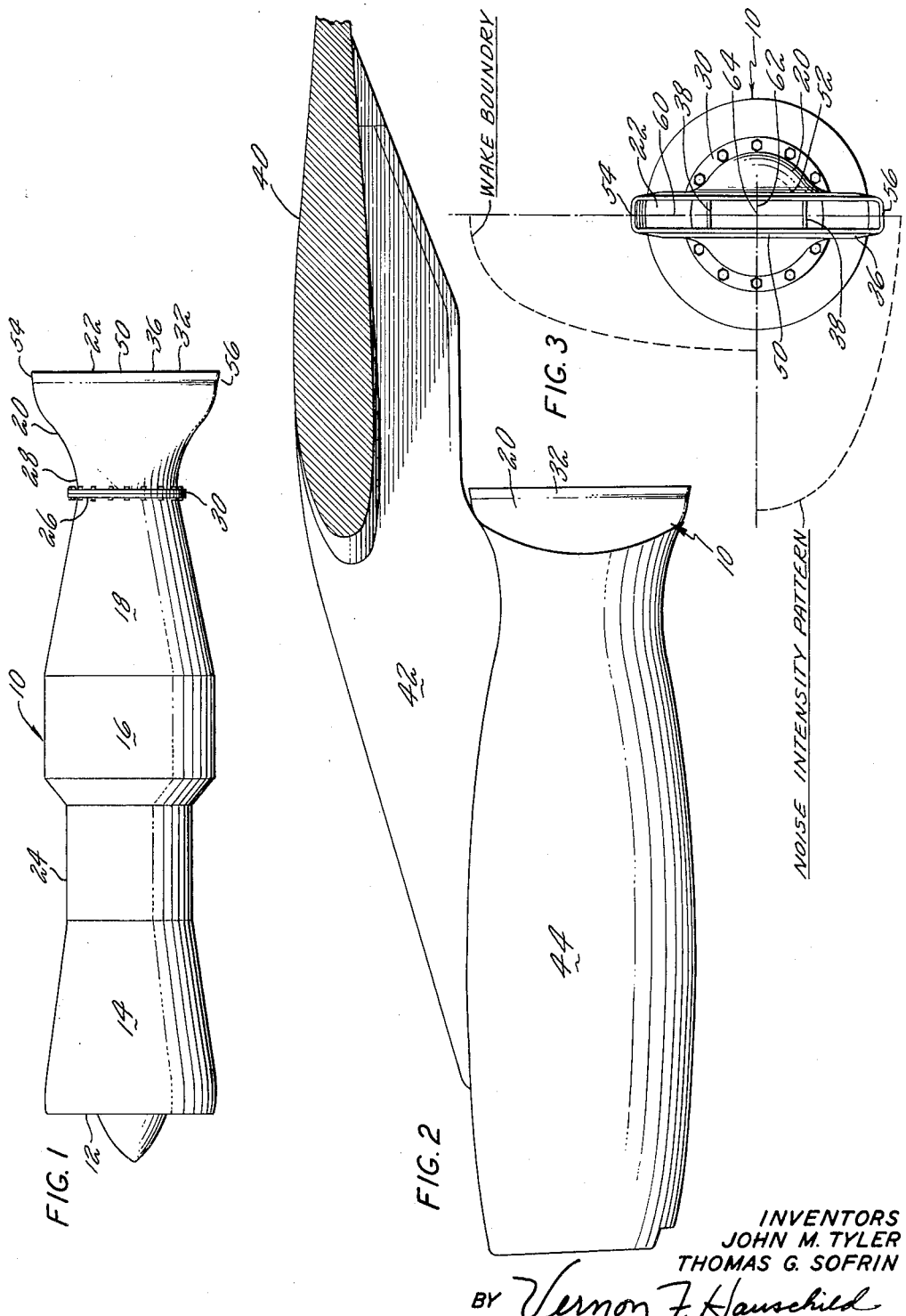

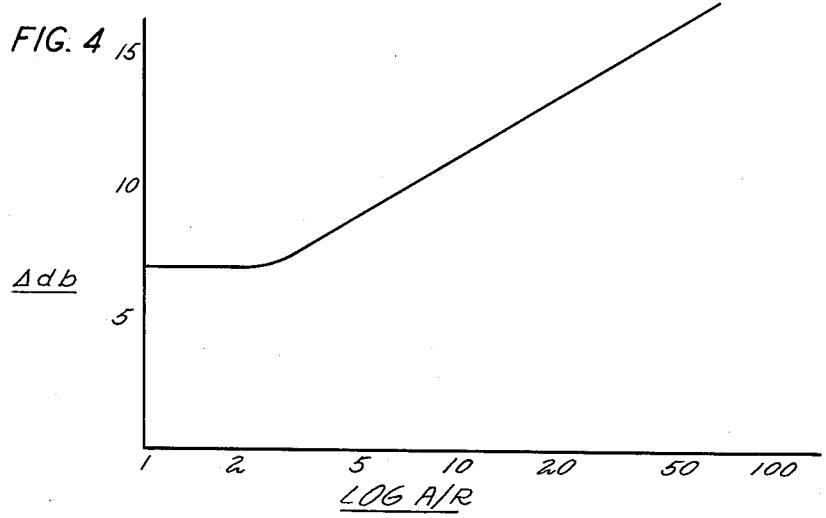
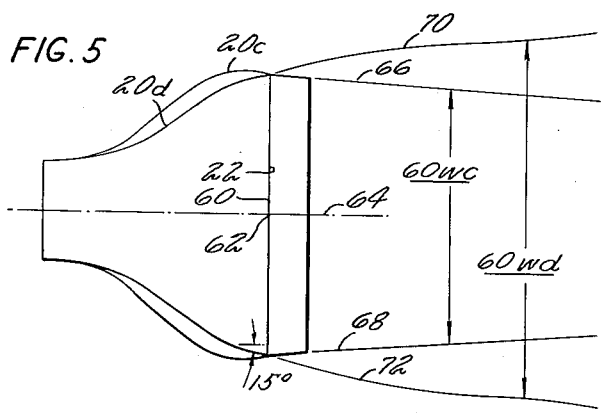
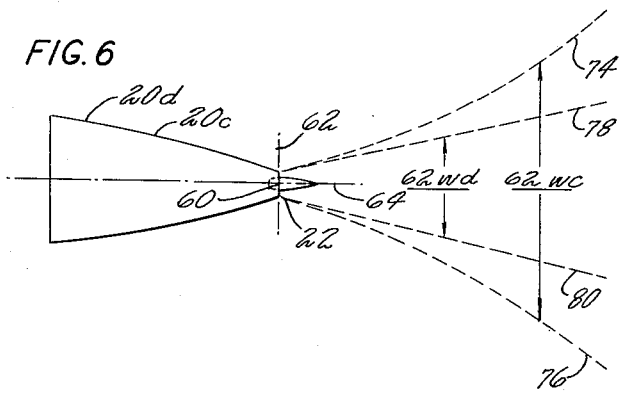
INVENTORS
JOHN M. TYLER
THOMAS G. SOFRIN
BY Vernon F. Hauschild
ATTORNEY INVENTORS
JOHN M. TYLER
THOMAS G. SOFRIN
BY *Vernon F. Hauschild*
ATTORNEY May 8, 1962 J. M. TYLER ETAL 3,033,494
JET WAKE NOISE INTENSITY PATTERN CONTROL MEANS
Filed Aug. 1, 1958 5 Sheets-Sheet 4

May 8, 1962 J. M. TYLER ETAL 3,033,494
JET WAKE NOISE INTENSITY PATTERN CONTROL MEANS
Filed Aug. 1, 1958 5 Sheets-Sheet 5

INVENTORS
JOHN M. TYLER
THOMAS G. SOFRIN
BY Vernon F. Hauschild
ATTORNEY

---

United States Patent Office 3,033,494
Patented May 8, 1962

---

3,033,494
JET WAKE NOISE INTENSITY PATTERN CONTROL MEANS
John M. Tyler, Glastonbury, and Thomas G. Sofrin, West Hartford, Conn., assignors to United Aircraft Corporation, East Hartford, Conn., a corporation of Delaware
Filed Aug. 1, 1958, Ser. No. 752,556
8 Claims. (Cl. 244—54)

This invention relates to control of the noise created by the wake of flight powerplants which generate thrust by discharging exhaust gases to atmosphere, such as modern aircraft turbojet engines, and more particularly the controlling of the pattern or profile of noise intensity created thereby.

Modern technology, in its quest of a solution to the problem of controlling jet engine noise to permit their use as aircraft powerplants at metropolitan airports and other thickly populated areas, have come to realize that the vast majority of the noise created by a jet engine occurs in the jet wake. Two separate approaches have been used in controlling jet wake noise, the first being to control the noise level by causing the noise to be created at a high frequency where noise attenuation is high as taught in U.S. application Serial Nos. 574,884, now Patent No. 2,944,392, and 588,742, now Patent No. 2,845,775, while the second has been to control the noise pattern or profile created by the jet engine wake, and this invention relates to the latter approach. In this regard, the main objection to jet wake noise occurs when the plane is in low altitude flight over a thickly populated area, for example, just after having taken off or preparing to land at a metropolitan airport. Accordingly, it is highly desirable to control the jet wake noise pattern so that minimum noise is directed groundwardly. It must be borne in mind that it is imperative to solve the problem of jet engine noise control without adversely affecting the thrust generated by the jet engine.

It is an object of this invention to control the noise pattern or profile created by a jet engine wake by causing the jet wake boundary to spread rapidly in the direction in which noise reduction is most desired.

It is a further object of this invention to accomplish the first-mentioned object by utilizing a discharge duct defining an exhaust gas outlet which has strategically positioned convergent walls and strategically positioned divergent walls adjacent the outlet or which utilizes flaps or turning vanes to accomplish wake flow direction control.

It is a further object of this invention to teach noise pattern control by increasing the aspect ratio of the jet wake in the direction in which minimum noise is desired.

It is still a further object of this invention to teach jet engine wake pattern control so that the noise level is minimum in a groundwardly direction comprising discharging the exhaust gases through an outlet or aperture, preferably a vertical slot, defined by a duct having convergent side walls defining the outlet and divergent top and bottom walls coacting therewith to define the outlet.

It is a further object of this invention to teach maintainence of the divergence for continuous operation described in the preceding object to be a maximum of approximately 15° so as not to adversely affect thrust generation.

It is still a further object of this invention to teach the shifting of the direction of maximum and minimum noise intensity in a jet engine wake by the use of a combination of convergent and divergent flow of exhaust gases adjacent the engine exhaust nozzle.

Other objects and advantages will be apparent from the specification and claims, and from the accompanying drawings which illustrate an embodiment of the invention.

FIG. 1 is an exterior view of a modern aircraft turbojet engine illustrating a discharge duct having our convergent and divergent flow creating jet wake noise pattern controller thereon.

FIG. 2 is a side view, partially in section, of an aircraft wing supporting a vertically extending engine support strut which in turn supports an engine of the type shown in FIG. 1 within a nacelle or pod so that at least a portion of the discharge duct using our noise pattern controller projects rearwardly therefrom to align with the vertical strut and nacelle.

FIG. 3 is a rear view of the engine shown in FIG. 1 with dotted line illustrations of the jet wake and the noise intensity pattern.

FIG. 4 is a graphic representation of the jet wake noise attenuation in decibels plotted against the logarithm of the engine exhaust gas outlet aspect ratio for exhaust apertures having convergent side walls and parallel end walls.

FIG. 5 is a schematic side view representation of the jet wake boundaries obtained from discharging exhaust gases through an aperture having convergent side surfaces and convergent as well as divergent top and bottom walls or end surfaces.

FIG. 6 is a similar showing to FIG. 5 excepting that it is a top view representation.

Figure 9:
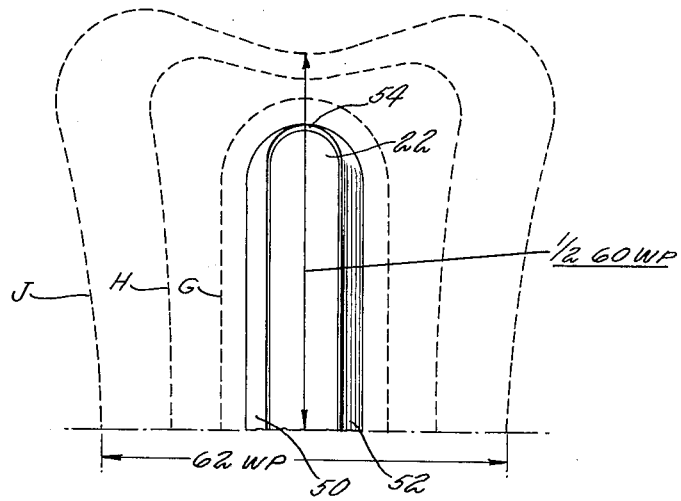
FIG. 9 is a schematic representation of wake boundary profiles taken at stations which are located at preselected distances from the exhaust outlet in a wake created by discharging exhaust gases through an aperture having 15° convergent side walls and parallel top and bottom or end walls.
Figure 10:
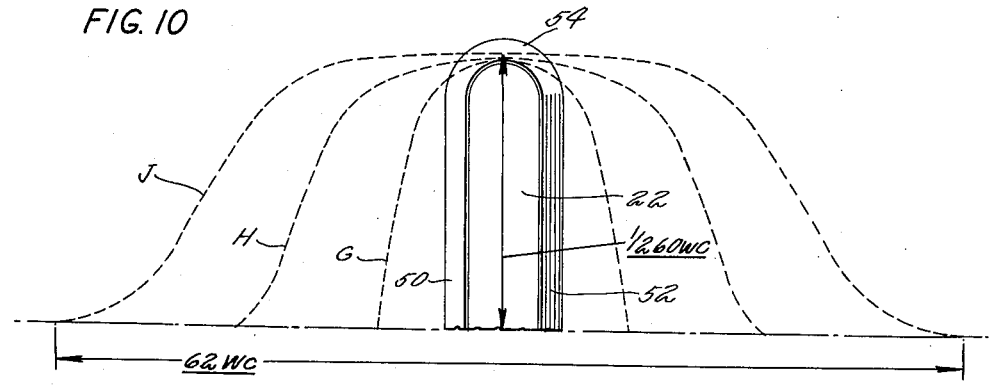
FIG. 10 is a similar schematic representation to FIG. 9 except that the wake is created by discharging the exhaust gases through an aperture which has 15° convergent side walls as well as 15° convergent top and bottom walls.
Figure 11:
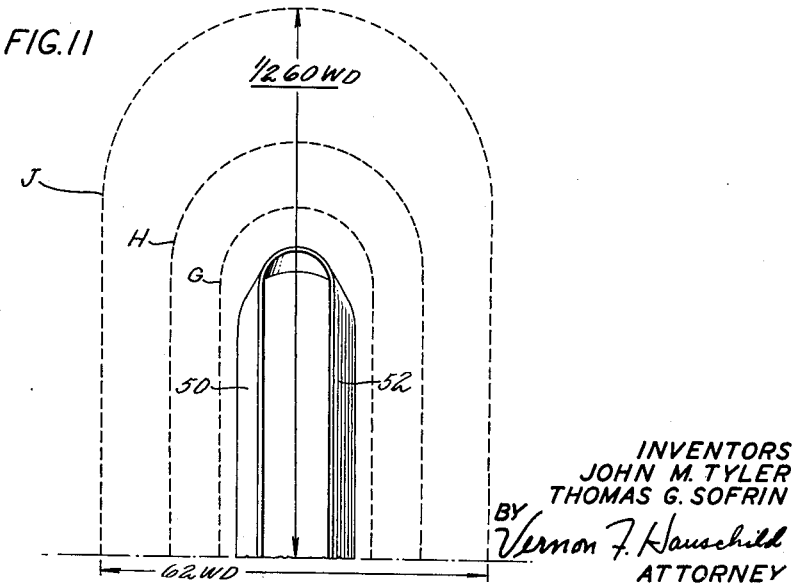

FIG. 11 is a similar representation as in FIGS. 9 and 10 excepting that the aperture has 15° convergent side walls and 15° divergent end walls.

Figure 12:
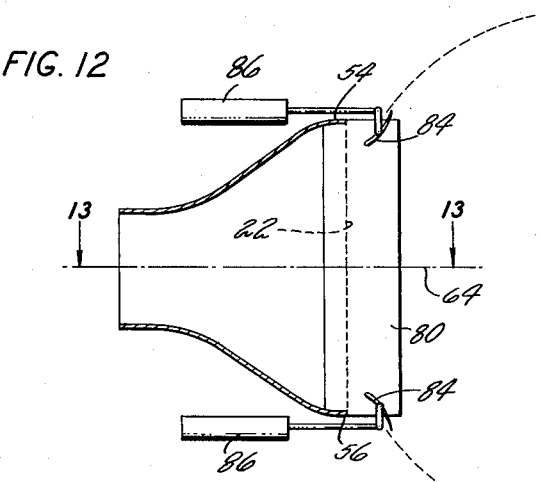

FIG. 12 is a side view of a modification of our invention depicting a discharge duct defining an aperture having convergent side walls with parallel end walls and utilizing turning vanes to effect divergent flow at the aperture ends.

Figure 13:
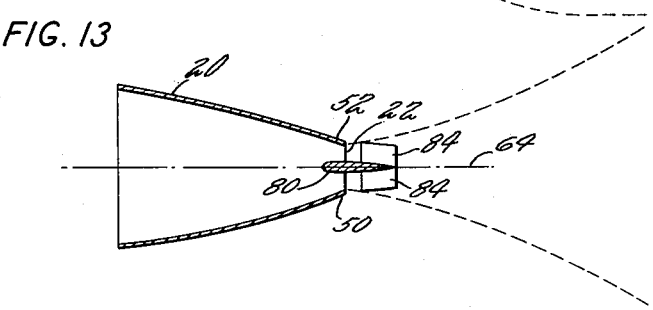

FIG. 13 is a section taken along line 13—13 of FIG. 12.

While, for purposes of illustration, our invention will be shown in the environment of a modern aircraft turbojet engine, it should be borne in mind that it is equally applicable to any powerplant which creates thrust by discharging its exhaust gases to atmosphere.

Referring to FIG. 1, we see a modern aircraft turbojet power-plant 10 which comprises air inlet section 12, compressor 14, burner 16, turbine 18 and discharge duct 20 which defines exhaust gas discharge outlet or aperture 22. Engine 10 has outer case 24, which is preferably of circular cross section and envelops compressor 14, burner 16 and turbine 18. Air enters inlet section 12 is compressed in passing through compressor 14, is heated in passing through burner section 16, and has power extracted therefrom to drive compressor 14 in passing through turbine 18. The exhaust gases pass through the circular outlet 26 of engine case 24 and are received in the circular inlet 28 of discharge duct 20 and are passed therethrough to be discharged to atmosphere through exhaust outlet or aperture 22 to generate thrust. Engine 10 may be of the type described in detail in U.S. Patent Nos. 2,711,631 and 2,747,367, to which reference may be had. Any convenient connecting means 30 such as mating flanges joined by a plurality of nuts and bolts may be used to attach discharge duct means 20 to engine outer case 24 in sealed relation.

Discharge duct 20 is preferably made of lightweight sheet metal and comprises inlet section 28, of circular cross section, and outlet section 32 which defines exhaust gas discharge outlet or aperture 22 which, while not necessarily so limited, is illustrated to be in the shape of a vertically extending slot to take advantage of the noise reduction accomplished by slot discharge as explained in U.S. Patent Nos. 2,939,279 and 2,935,842 and anti-drag alignment with the pylon and nacelle. Discharge duct 20 further includes intermediate section 34 which smoothly joints inlet section 28 and outlet section 32 and coacts therewith to form a unitary gas flow passage. Discharge duct 20 is preferably of smooth interior and exterior surfaces and is so contoured that no rapid cross-sectional area changes occur throughout its length excepting a nozzle 36 which is defined by outlet section 32 immediately adjacent slot 22. Support webs or flow directing vanes 38 (FIG. 3) may be used in nozzle 36 of discharge duct 20 to support the sheet metal structure.

Referring to FIG. 2, we see substantially horizontally extending aircraft wing 40 which supports vertically extending and airfoil shaped engine support strut or pylon 42, which in turn supports engine 10 within engine nacelle 44. It will be noted that discharge duct 20 projects rearwardly from engine nacelle 44 and that nacelle 44 is contoured so as to smoothly blend with discharge duct 20 while the vertically extending discharge section 32 of duct 20 aligns with vertical strut 42 and nacelle 44 so as to present a minimum of aerodynamic drag creating surfaces in flight.

Referring to FIG. 3, we see a rear view of engine 10 showing vertically extending, slot shaped exhaust outlet aperture 22 defined by convergent, vertically extending side walls 50 and 52 and by diverging top and bottom or end walls 54 and 56.

From FIG. 3 it will be seen that slot 22 has a major or greater axis 60 and a minor or lesser axis 62. FIG. 3 further shows a portion of the noise intensity pattern and wake boundary of the type attained with the FIG. 3 nozzle.

With this structural setting in mind, let us consider the findings learned while in quest of a solution to the jet wake noise directivity control problem. It had previously been determined that noise intensity can be abated by discharging the exhaust gases through one or more slots and this is described in U.S. application Serial No. 712,418, and U.S. Patent Nos. 2,939,279 and 2,935,842. Noise pattern tests were performed on single slot exhaust gas outlets having convergent side walls and parallel top and bottom walls while varying the aspect ratio of the slot. As used herein, slot or wake aspect ratio means the quotient of the slot or wake major or greater axis divided by the slot or wake minor or smaller axis. It will be noted by referring to the FIG. 4 graph that for such a slot utilizing an aspect ratio of 50, a 16 decibel difference occurs in the far field noise intensity pattern a point in line with the major axis of the slot, which intensity was greater for a conventional conical nozzle than for points above and below the vertical slot type nozzle. When the aspect ratio of the slot was reduced to 10, the decibel difference reduced to 11, but it will be noted that as the aspect ratio was reduced further, the decibel difference reduced very gradually until, when a square aperture was tested with the same converging sides and parallel top and bottom surfaces, a seven decibel noise intensity difference existed. This led to the realization that factors in addition to slot aspect ratio affect the noise directivity pattern. To test this theory further, a square discharge outlet, convergent on all sides was tested, and this gave only one decibel or so less noise off the side as compared with a circular conical nozzle. Having proven that the convergent side surfaces are a factor in controlling the noise directivity pattern, tests were then made using exhaust gas discharge ducts defining single slot apertures having convergent side walls and further having parallel end walls as well as end walls which diverge to varying degrees. The results of these tests are depicted graphically in FIGS. 7 and 8. The tests were conducted in an anechoic chamber by moving a microphone between a so-called 90° position which is the position vertically above or below the exhaust gas discharge slot 22 and then moving the microphone in 10° increments to a position near the wake of the discharge from the slot on axis 64.

Figure 7:
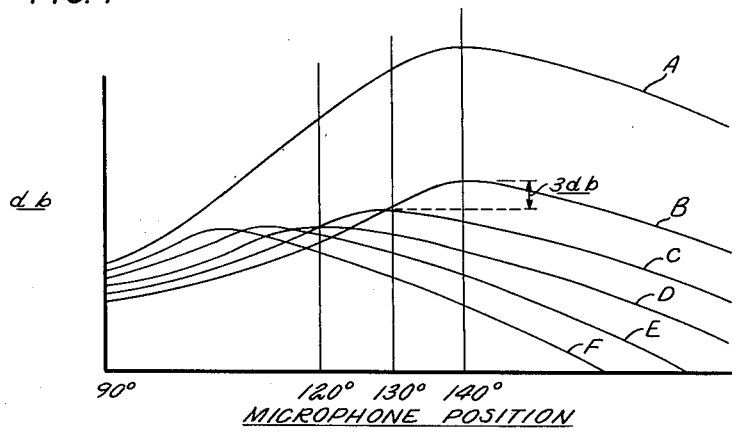
FIG. 7 is a graphic representation of noise intensity in decibels plotted against angular microphone position with respect to the exhaust outlet to illustrate the effect of varying the divergence of the exhaust outlet top and bottom walls or end surfaces while maintaining the side walls convergent.

Referring to FIG. 7, curve A represents the decibel plot for the various microphone angular positions when the exhaust gas is discharged through the standard circular exhaust outlet. It will be noted that this curve has a decibel or noise intensity peak at the 140° position. Curve B represents discharge through a slot having a 7 to 1 aspect ratio with parallel end surfaces 54 and 56 and convergent side surfaces 50 and 52. It will be noted that curve B also has a decibel peak at about 140° but a substantial peak intensity reduction is noted. Curve C represents discharge through a slot with the same aspect ratio and with the same convergent side walls but with 10° divergent end walls. It will be noted that the curve peak shifted to the 130° position and at a 3° decibel lesser noise intensity reading. Curve D represents discharge through a similar exhaust outlet but with 15° divergent end walls. Curve D peaks at about 120° and there is but a slight decibel reduction at peak noise intensity. Curves E and F represent discharge through similar outlets but with 20° and 30° divergent ends, respectively, and it will be noted that while these curves continue to shift anglewise in peak intensity, the decibel difference in peak intensity noise is negligible.

Figure 8:
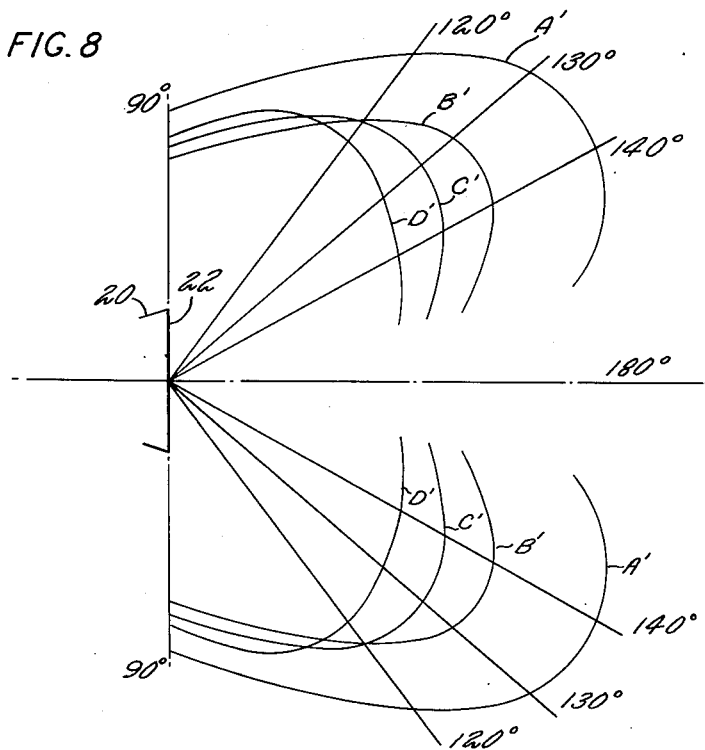
FIG. 8 is a similar showing to FIG. 7 excepting it is a polar plot of the same data to show intensity and directivity with respect to the exhaust outlet aperture.

In FIG. 8, curves A', B', C' and D' represent polar plots of their alphabetical counterparts in curve 7.

FIGS. 5, 6, 9, 10 and 11 represent wake boundary plots, as opposed to noise intensity plots, and are included to explain how the convergent and divergent contouring and flow affects wake flow or shape to bring about these changes in noise directivity pattern.

Referring to FIG. 5, we see schematic representations of wake boundary created by passing exhaust gases through a slot shaped aperture 22, generally of the type shown in FIG. 3, having a major or greater axis 60 and a minor or lesser axis 62. The FIG. 5 wake boundary plots are for a single slot exhaust nozzle having convergent sides in both instances but with convergent ends in one instance and divergent ends in the other, as depicted by the cross section of ducts $20_c$ and $20_d$, respectively. When convergent ends were used, the wake boundary about axis 64 along major axis 60 is shown at lines 66 and 68 so that the wake major axis is shown as $60_{wc}$. When divergent ends are used, the wake boundaries are shown by lines 70 and 72 and the major axis is shown as $60_{wd}$. It will be seen from FIG. 5 that divergent end surfaces cause an increase in the major axis of the wake. In FIG. 6 the convergent end surface wake boundary lines are shown at 74 and 76 while the divergent end surface wake boundary lines are shown at 78 and 80, thereby establishing wake minor axes of $62_{wc}$ and $62_{wd}$, respectively, so that the use of divergent ends reduces the wake minor axis. Combining the teachings of FIGS. 5 and 6 it will be apparent that by the use of a discharge outlet having convergent side walls and divergent end walls we increase the wake aspect ratio, $60_{wd}$ divided by $62_{wd}$. FIGS. 9, 10 and 11 further serve to illustrate the effect of exhaust outlet contouring and/or exhaust gas flow direction control to alter wake aspect ratio. FIG. 10 represents a slotted exhaust outlet 22 of 7 to 1 aspect ratio having convergent side walls 50 and 52 and convergent end walls 54 and 56. Curve G represents the wake boundary or profile at a position or station 2½ times slot width or minor axis downstream of outlet 22. Curve H represents the wake boundary or profile at a position or station 5 times slot minor axis downstream of the outlet, while curve J represents wake boundary or profile at a position or station 10 times slot minor axis downstream of the outlet. It will be noted that at curve J, the wake major and minor axis $60_{wc}$ divided by $62_{wc}$ is approximately 1 so that there is an aspect ratio of 1. FIG. 9 depicts wake boundary curves G, H, and J for a slotted outlet of the type described in connection with FIG. 10 excepting that end surfaces 54 and 56 are parallel. It will be noted that the wake aspect ratio $60_{wp}$ divided by $62_{wp}$ is greater than in the FIG. 10 configuration. In FIG. 11 curves G, H, and J represent wake boundaries for the same positions as illustrated in FIGS. 9 and 10 for discharge from an exhaust outlet which is similar to the FIG. 10 outlet excepting that its end walls 54 and 56 are divergent. It will be noted that the aspect ratio $60_{wd}$ divided by $62_{wd}$ is greater than in FIGS. 9 and 10. By effecting increased wake aspect ratio we are causing the wake to spread more rapidly in the direction of its major axis and thereby dissipate the noise radiated in that direction more quickly.

With this in mind, by selectively directing our wake major axis, we can select the direction in which the minimum noise of our jet wake noise pattern is to be directed. As mentioned previously, minimum noise is normally required in the groundward direction to reduce the noise directed to thickly populated areas when jet engine powered airplanes fly thereover at low altitude.

FIGS. 12 and 13 represent a scheme which will replace and/or amplify the divergence produced by divergent end surfaces of 54 and 56 of the exhaust outlet 22, should such be desired for manufacturing or performance purposes. FIGS. 12 and 13 show that turning vanes may be placed on a centrally located body 80 adjacent top and bottom or end surfaces 54 and 56 of slot 22 defined by discharge duct 20.

The inner body 80 is shown in some of the exhaust nozzles illustrated herein since it represents a convenient way of effecting a convergent-divergent exhaust nozzle without providing divergence in the exhaust nozzle forming walls. Further, the convergent-divergent exhaust nozzle formed with inner body 80 has greater efficiency performancewise over a larger range of pressure ratios than does a convergent-divergent exhaust nozzle formed by the use of divergence in the exhaust nozzle walls.

The main features of rectangular nozzle noise suppressors are (1) the reduction in overall noise power, (2) the elliptical noise directivity pattern, i.e. less noise radiated off the short ends than off the long sides of the nozzle and (3) the greater ellipticity of the high frequency noise than of the low frequency noise. Each of these features can be explained empirically as follows:

(1) The principle of increasing the mixing perimeter of a jet nozzle to reduce the overall noise power of a jet has been employed in the design of many noise suppressors, notably the corrugated and multi-tube suppressors. This principle can also account for some of the noise power reduction achieved by a rectangular nozzle.

(2) In tests of multi-tube arrays with the nozzles arranged in a line, it has been observed that adjacent nozzle wakes tend to shield the noise from neighboring wakes, with the net result that less noise is radiated along the line of the nozzles than normal to the line. Thus, for a single rectangular nozzle it can be reasoned that turbulent flow regions shield the noise from adjacent regions. Because of greater shielding, noise generated within the flow cannot travel across the long dimension of the wake as readily as across the short dimension, with the result that less noise is radiated off the short ends than off the long sides of the wake.

(3) The wake shielding effect can also account for the greater ellipticity in high frequency than in low frequency noise. The shielding is probably due to sound scattering by the turbulence and inhomogeneities within the jet wake. Because high frequency sound is more easily scattered than low frequency sound, the wake shielding is more effective on the higher frequency noise.

The preceding explanations of the noise radiation characteristics of rectangular nozzle noise suppressors are based on logic and intuition. It is also interesting to note that the second and third features can be explained by Lighthill's theory of aerodynamic noise applied to a rectangular jet wake. Lighthill's theory is expressed and fully explained in "On Sound Generated Aerodynamically"; Part II—Turbulence as a Sound Source. Proceedings of the Royal Society A, vol. 222, 1954. First recall that Lighthill shows that the noise from a jet wake results from many small quadrupole noise sources distributed throughout the wake. The strength of a given quadrupole is a function of the local pressure fluctuation, local means shear, and local turbulent eddy volume or quadrupole size. In a circular jet wake the means shear $$\frac{\partial V}{\partial r}$$

(rate of change of axial velocity component with radial distance) is by far the largest shear, so that the quadrupoles associated with $$\frac{\partial V}{\partial r}$$

are the predominant noise sources. Further, the large means shear aligns all of the predominant noise sources, which would otherwise be randomly oriented, with the net result that the far field noise radiation pattern in the axial-radial plane is essentially that of a single large quadrupole. Both the individual and the overall quadrupole radiation patterns are four-lobed with zero noise intensity in the jet flow direction and in directions normal to the flow direction.

Because of the axial symmetry of the circular nozzle, it completely defines the far field noise radiation pattern. However, the radiation pattern of an individual quadrupole in the wake is not axially symmetrical. The individual quadrupole and overall noise radiation patterns is in a plane normal to the circular jet wake. In this plane the quadrupole has a radiation pattern similar to that of a dipole with maximum noise radiated normal to the circles of constant means shear and zero intensity tangent to the constant shear lines.

In the cross section of a rectangular wake, the quadrupoles are aligned along the lines of constant shear, or, along the shear planes. However, because of their greater length, the shear planes parallel to the long sides of the wake align many more quadrupoles than do the shear planes parallel to the short ends. Because the quadrupoles radiate maximum noise normal to the shear planes and no noise along the shear planes, the intensity of the noise radiated off the long sides of the nozzle is greater than that radiated off the short ends. Therefore, in a very simple picture, the far field noise in the cross sectional plane can be represented by the combined field of two orthogonal quadrupoles, a strong quadrupole radiating maximum noise off the sides of the wake and a weaker quadrupole radiating maximum noise off the ends of the wake. The relative strengths of the two quadrupoles will obviously be a direct function of wake aspect ratio. The conclusion is that rectangular nozzle noise ellipticity or directivity should increase with increasing wake aspect ratio.

The greater ellipticity or directivity of the high frequency than of the low frequency noise of rectangular nozzles is also accounted for by Lighthill's theory, for Lighthill points out that the highest noise frequencies are generated in a jet wake close to the nozzle exit, and correspondingly lower frequencies are generated as the jet flow proceeds downstream through lower mean shear regions. Since quadrupole alignment is a direct function of mean shear, the high frequency quadrupoles located close to the nozzle exit are more completely aligned than the lower frequency quadrupoles farther downstream. For a rectangular nozzle having convergent sides and parallel ends and with an aspect ratio significantly greater than unity, the wake aspect ratio is highest close to the nozzle exit and decreases gradually with distance downstream. Because of both the decreasing wake aspect ratio and decreasing mean shear with distance downstream the high frequency noise should exhibit greater ellipticity than the lower frequency noise.

For the special class of suppressors with aspect ratio close to unity, a wake aspect ratio greater than unity is achieved through appropriate nozzle design. With this type of nozzle the wake aspect ratio rapidly increases to a value significantly greater than the nozzle aspect ratio, and then very gradually decreases with distance downstream. With this type of nozzle it might be expected that the highest frequencies generated very close to the nozzle should exhibit no ellipticity and that the midfrequencies should exhibit the greatest ellipticity. However, experimental results indicate that the highest audible frequencies have the greatest ellipticity. Although this anomaly has not been resolved, there is a possible explanation based on Lighthill's finding that the intensity of a quadrupole is a function of the intensity of the mean shear. A low aspect ratio nozzle is designed so that the flow from the nozzle expands rapidly in one dimension and less rapidly or even contracts in the other dimension normal to the flow. If the rapidly expanding portion of the wake acts to reduce the mean shear in the direction of expansion, the strength of the quadrupoles associated with this shear will be lessened. Thus, even though the wake aspect ratio is little greater than unity close to the nozzle exit, the noise reduction resulting from the reduction of the mean shear in the expanding direction would augment the high frequency noise ellipticity.

The principle of reducing mean shear in a jet wake to reduce the strength of the quadrupoles and thereby achieve a noise reduction can account for the action of many noise suppression devices which increase the expansion rate of a jet wake. In rectangular nozzle devices the reduction of mean shear may be a major factor in the noise suppression achieved by rectangular nozzles of aspect ratio less than unity, and at least partly responsible for the augmentation of noise suppression wrought by divergence and turning vanes on the ends of nozzles. Also in many other types of noise suppressors, such as the corrugated nozzle, which promote the rapid expansion of a jet wake, the reduction of mean shear can account for the reduction in noise power.

The theory of rectangular nozzle noise suppression inherently emphasizes the necessity of maintaining a high aspect ratio exhaust wake throughout the region of predominant noise sources in the wake. The importance of high wake aspect ratio was also realized from experimental studies. In the development of rectangular nozzle noise suppressors various devices were employed to increase the wake aspect ratio, or at least to maintain a high aspect ratio throughout the region of predominant noise sources. In order to demonstrate the effectiveness of these devices, shadowgraph, smoke photography and pressure probing techniques were incorporated to outline the suppressor exhaust wake profiles. From these profiles exhaust wake aspect ratios were determined at various downstream locations. The very rapid decrease in aspect ratio to a value of one and less for the nozzle with convergent ends correlates with the negligible noise suppression by this nozzle. The nozzle with parallel ends maintains a modest aspect ratio downstream and achieves correspondingly modest noise suppression. The effect of nozzle end divergence is to reinforce the downstream aspect ratio and thereby augment the noise suppression. Finally, the addition of a turning vane to one of the divergent ends results in greater reinforcement of the downstream aspect ratio and a correspondingly greater noise reduction. This experimental verification of the correlation between exhaust wake aspect ratio and noise reduction further illustrates the necessity of maintaining a high aspect ratio exhaust wake throughout the region of predominant noise sources in the wake.

It is to be understood that the invention is not limited to the specific embodiment herein illustrated and described but may be used in other ways without departure from its spirit as defined by the following claims.

We claim:

1. A jet engine noise suppressor having an axis and comprising duct means attachable to the engine to receive engine exhaust gases therefrom, said duct means culminating in a rectangular aperture communicating with the atmosphere and defining an engine exhaust gas outlet of reduced cross-sectional area, said duct means being convergent immediately adjacent said aperture in a plane through said axis where maximum wake noise can be tolerated and divergent immediately adjacent said aperture in a plane through said axis where minimum wake noise is desired.

2. A jet engine noise suppressor comprising duct means attachable to the engine to receive engine exhaust gases therefrom, said duct means culminating in an aperture having four sides with opposite sides parallel and communicating with the atmosphere and defining a rectangular engine exhaust gas outlet of reduced cross-sectional area, a first two of said parallel opposite sides positioned from one another in the direction where minimum noise is desired and a second two of said parallel opposite sides positioned from one another in a direction perpendicular to said minimum desired noise direction, said duct means being divergent immediately adjacent and for the full length of said first two parallel sides and convergent immediately adjacent and for the full length of said second two parallel sides.

3. A jet engine noise suppressor having an axis and comprising a duct unit, said duct unit having an exhaust gas inlet section shaped to attach to an engine to receive exhaust gases therefrom, said duct unit having an exhaust gas outlet section defining a vertically extending elongated slot having four sides with opposite sides parallel and communicating with the atmosphere and defining a rectangular engine exhaust gas discharge outlet of reduced cross-sectional area, said duct unit further having an intermediate section smoothly joining said inlet and outlet sections and cooperating therewith to define an exhaust gas passage and having side walls each of which converges about 15° with respect to said axis and defines the vertical sides of said slot and end walls adjoining said side walls to define said slot and each of which diverge a maximum of 15° with respect to said axis.

4. A jet engine noise suppressor having an axis comprising a unitary duct unit, said duct unit having an engine exhaust gas inlet section of circular cross section and having connecting means to attach said duct unit to an engine to receive all exhaust gases therefrom, said duct unit also having an engine exhaust gas outlet section defining one elongated slot communicating with the atmosphere and constituting the sole engine exhaust gas discharge outlet of reduced cross-sectional area, said slot having straight side portions joined by end portions, said duct unit further having an intermediate section smoothly changing in cross-sectional shape throughout its length from circular adjacent said inlet section to the shape of said elongated slot adjacent said outlet section and smoothly joining said inlet and outlet sections and cooperating therewith to define a unitary exhaust gas passage, said intermediate section being shaped convergently adjacent said slot side portions and divergently adjacent said slot end portions and reducing in cross-sectional area at said slot and having no rapid cross-sectional area changes throughout the remainder of its length and having exhaust gas flow turning vanes positioned at said slot end portions to intercept and turn exhaust gas away from said axis.

5. An engine having an axis and generating thrust by expelling heated and pressurized exhaust gases to atmosphere and having an enveloping outer case of circular cross section with an inlet and an outlet in combination with a noise suppressor coaxial with said engine and comprising a duct unit, said duct unit having an exhaust gas inlet section of circular cross section attached to said engine outlet to receive engine exhaust gases therefrom, said duct unit also having an exhaust gas outlet section defining a rectangular aperture having parallel side surfaces and parallel top and bottom surfaces perpendicular to and joining said side surfaces of reduced cross-sectional area and through which all engine exhaust gases are discharged to atmosphere, said duct unit further having an intermediate section smoothly joining said inlet and outlet sections and cooperating therewith to define a unitary gas passage with said engine outer case, said intermediate section having convergent walls immediately adjacent and extending the full length of said side surfaces of said aperture and divergent walls immediately adjacent and extending the full length of said top and bottom surfaces.

6. In combination, a substantially horizontally extending aircraft wing, an engine support strut attached to said wing and extending substantially vertically therefrom, an engine pod attached to said strut and supported by said wing through said strut, said pod having a smoothly contoured exterior and a hollow interior of substantially circular cross section and being so positioned that ram air will enter a first end thereof and be discharged through a second end of said pod interior during flight, a jet engine of substantially circular cross section enveloped within said pod and supported by said strut and having an air inlet section corresponding with said pod interior first end and an exhaust gas outlet section corresponding with said pod interior second end, and a noise suppressor attached to said engine exhaust gas outlet section and receiving all engine exhaust gases therefrom and comprising a thin-walled duct unit having an inlet section of circular cross section adjacent said engine and an outlet section defining a vertically extending elongated rectangular slot having parallel side surfaces and parallel top and bottom surfaces perpendicular to and joining said side surfaces and aligned with said strut and constituting the sole aperture through which engine exhaust gases may be discharged to atmosphere to generate thrust and further having an intermediate section joining said inlet and outlet sections and being smoothly contoured to gradually change in shape along its length from the circular cross-sectional shape of said inlet section to the vertically extending slot shape of said outlet section, said intermediate section having convergent walls immediately adjacent and extending the full length of said side surfaces of said slot and divergent walls immediately adjacent and extending the full length of said top and bottom surfaces of said slot, said strut, pod and noise suppressor having smoothly blending exterior surfaces to prevent drag creation.

7. A jet engine noise suppressor comprising duct means attachable to the engine to receive engine exhaust gases therefrom, said duct means culminating in an aperture communicating with the atmosphere and defining the engine exhaust gas outlet, of reduced cross-sectional area, said duct having convergent side walls immediately adjacent and defining the sides of said aperture and nonconvergent walls immediately adjacent and defining the top and bottom of said aperture, and flow turning vanes at the top and bottom of said aperture shaped and positioned to intercept exhaust gas flow and to cause divergent flow.

8. A jet engine noise suppressor having an axis and comprising duct means attachable to the engine to receive engine exhaust gases therefrom, said duct means culminating in a rectangular aperture communicating with the atmosphere and defining the engine exhaust gas outlet of reduced cross-sectional area, said duct having convergent side walls immediately adjacent and defining the sides of said aperture, and means positioned immediately adjacent the top and bottom of said aperture and shaped to establish divergent exhaust gas flow adjacent thereto with respect to said axis and being movable to vary the degree of flow divergence.

References Cited in the file of this patent

UNITED STATES PATENTS

| 1,175,206 | Turner | Mar. 14, 1916 |
| 2,652,127 | Johnston | Sept. 15, 1953 |
| 2,664,700 | Benoit | Jan. 5, 1954 |
| 2,822,996 | Zborowski | Feb. 11, 1958 |
| 2,866,316 | Towle | Dec. 30, 1958 |
| 2,928,238 | Hawkins | Mar. 15, 1960 |

FOREIGN PATENTS

| 744,196 | Great Britain | Feb. 1, 1956 |

OTHER REFERENCES

Douglas B-66B, page 269 of Jane's All the World's Aircraft (1956).

Richards: Journal of the Helicopter Association of Great Britain (pp. 404–410).

NACA, TN 3590, January 1956.